W. C. SCHRODER.
GREASE RETAINER.
APPLICATION FILED JUNE 29, 1915.
1,199,931.
Patented Oct. 3, 1916.
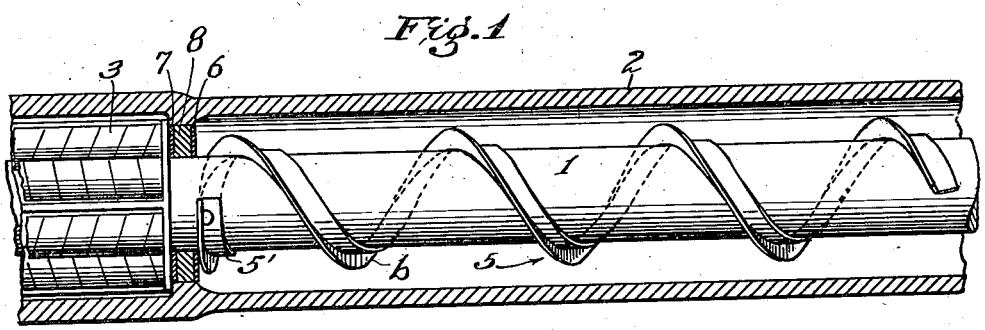
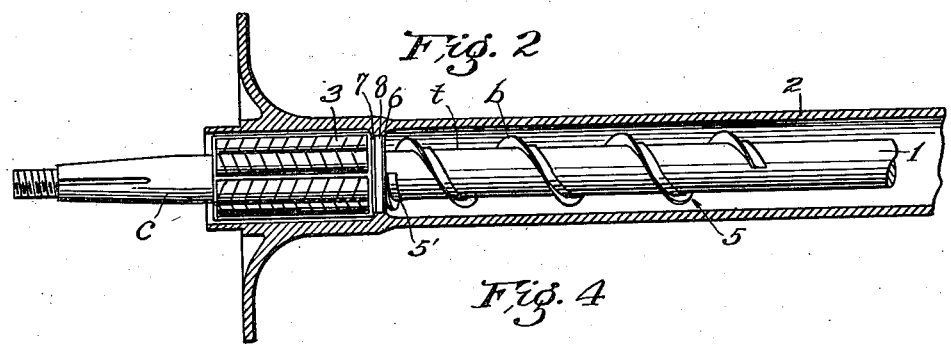
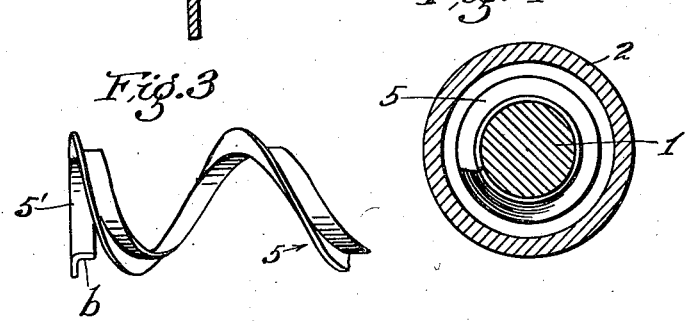
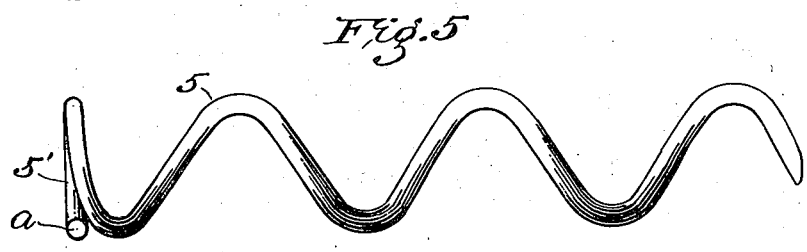
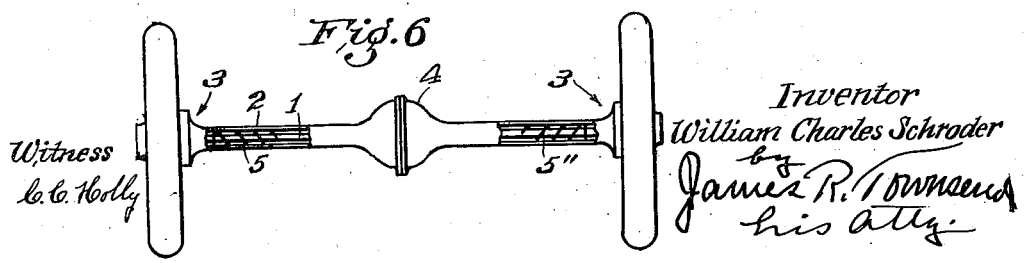
Witness
C. C. Holly
Inventor
William Charles Schroder
by James R. Townsend
his atty.

UNITED STATES PATENT OFFICE.

WILLIAM CHARLES SCHRODER, OF HERMOSA BEACH, CALIFORNIA, ASSIGNOR OF ONE-HALF TO ALBERT P. WORTHINGTON, OF LOS ANGELES, CALIFORNIA.

GREASE-RETAINER.

1,199,931.  Specification of Letters Patent.  Patented Oct. 3, 1916.

Application filed June 29, 1915. Serial No. 37,105.

*To all whom it may concern:*

Be it known that I, WILLIAM CHARLES SCHRODER, a citizen of the United States, residing at Hermosa Beach, in the county of Los Angeles and State of California, have invented a new and useful Grease-Retainer, of which the following is a specification.

This invention relates to means applicable for retaining grease within a housing of the driving axle of a motor car between the anti-friction bearing at the end of the housing and the differential gearing or other means by which power is applied to drive the axle.

The invention is particularly designed in the present application to force the grease away from the passage at the end of the housing through which it might escape to the driving wheel and to cause the grease to pile up along the intermediate portion of the axle.

An object is to prevent the grease from working out of the axle housing onto the brakes and driving wheels.

The invention broadly considered comprises a worm fixed at the outer bearing to the axle and turning therewith and relative to and in combination with the housing and arranged to convey the grease away from the wheel end of the axle.

More particularly the invention comprises an attachment which can be easily applied to the axle to perform the work as above stated. The device may be variously constructed and comprises in connection with the worm a suitable packing arranged between the worm and the wheel end or outer bearing of the axle and will be herein illustrated in two of the forms in which I have embodied the same.

An object is to effect the desired result by the cheapest, simplest and most effective means without the necessity of ratchets or other complicated or expensive contrivances.

The accompanying drawings illustrate the invention.

Figure 1 is a fragmental view, partly in elevation and partly in section, showing the preferred form in which the invention is embodied. Fig. 2 is a fragmental view on a smaller scale, partly in section, showing the tip of the axle to which the drive wheel, not shown, is fixed in actual practice. Fig. 3 is a detached fragment of the detachable worm. Fig. 4 is a view from the left of Fig. 3 showing the axle and housing in section. Fig. 5 is a detached view of another form of worm. Fig. 6 is a somewhat diagrammatic representation of the invention as applied to the driving axle of an automobile with wheels attached.

Axle 1, housing 2 and outer anti-friction bearing 3 are of the usual construction, said axle having anti-friction bearings 3 at each end between the housing and the axle to form a support for the housing on the axle. The differential gearing 4 is also of the usual construction and arranged between the two outer bearings 3 which form avenues for escape from the housing, of the grease that is required for lubricating the differential gearing 4. The axle is provided with a worm 5 extending a distance therealong and turning with the axle and arranged to convey lubricant away from the outer axle bearing 3; being adapted to serve as a conveyer with a direction away from the outer anti-friction bearing 3 and toward the middle of the axle. Said worm 5 terminates in a limb 5' formed practically as a retaining ring, the same being an abrupt turn to measurably encircle the axle to pick up the grease to apply it to the worm which is adapted to convey the lubricant away from said abrupt bend. Said abrupt bends practically form spring rings that tightly fit the axle which is slightly taper at the portion *t* adjacent the bearing 3, and the worm is fixed to the axle by forcibly driving the worm and its attaching ring 5' onto the taper portion of the axle.

A packing is arranged between the anti-friction bearing and the outer end of the worm to close the space between the axle 1 and the housing 2. Said packing is desirably constructed of two steel washers 6, 7 and a yielding felt washer 8 interposed between the same. The metal washers 6, 7 fit the axle so tightly that they can only be moved therealong by the application of considerable force, and they squeeze the felt washer 8 tightly between them and said felt washer fits the inside of the housing tightly to retain the lubricant.

In practice to apply the grease retainers to an axle right and left helices 5, 5'' are applied to the opposite ends of the axle, due reference being had to the main general forward direction in which the axle is to be turned to drive the car so that when the helices being surrounded by grease inside the housing, turn with the axle, they will act as conveyers to convey grease away from the wheel ends and toward the middle of the axle. The axle equipped with the two worms will be mounted inside the housing and the three washer members 6, 7 and 8 will be applied to the axle and driven forcibly inward until the outer steel washer 7 is located where it will be just free from the anti-friction bearing 3 when the bearings are installed and the wheels in place. The attendant will then install the bearings and apply the axle wheels in the usual way.

The outer end of the worm is bent into ring shape to tightly fit the axle, so that the worm will turn with the axle, and the body of the worm also fits the axle tightly and may extend a considerable distance therealong, and in practical operation the ring portion of the worm gathers the lubricant that tends to flow or work outward along the axle, and conveys the grease inward toward the differential gearing 4.

The most satisfactory construction is had by making the worm from a piece of wire of a cylindrical shape as indicated at $a$ in Fig. 5, but the worm may be constructed with angular cross-section being practically of a trough shape as shown at $b$ in Figs. 1, 2 and 3. With this construction the channel at $b$ gathers the grease and carries it away from the bearing ends $c$ at the axle; but the round wire form shown in Fig. 5 is preferable on account of the cheapness and ease of manufacture and the ease of fixing it to the axle by means of its own resiliency.

I claim:—

1. The combination with the rear axle of an automobile, a housing therefor, anti-friction bearings at the ends of said axle, a grease containing gear case to which the inner end of said axle is connected, a grease retainer removably mounted on said axle between said bearings, said retainer comprising a wire member helically wound about said axle, the wheel end of said member being ring shaped and adapted to frictionally grip said axle to hold said wire member in position, and a packing between said ring shaped end and the anti-friction bearing adjacent thereto, the helix of the wire member being so disposed as to convey grease in said housing toward said gear case during the normal rotation of said axle.

2. The combination with the rear axle of an automobile, a housing therefor, anti-friction bearings at the ends of said axle, a grease containing gear case to which the inner end of said axle is connected, a grease retainer removably mounted on said axle between said bearings, said retainer consisting of a member helically wound about said axle, the wheel end of said member being ring shaped and adapted to frictionally grip said axle to hold said member in position, the helix of said member being so disposed as to convey grease in said housing toward said gear case during the normal rotation of said axle.

3. A grease retainer for the rear axle of an automobile, comprising a helical wire having one end thereof ring shaped, said wire being adapted to be slipped over said axle and said ring shaped end being adapted to frictionally engage and grip the axle to hold said wire in position.

In testimony whereof, I have hereunto set my hand at Los Angeles, California, this 21st day of June 1915.

WILLIAM CHARLES SCHRODER.

In presence of—
JAMES R. TOWNSEND.